United States Patent
Salmon

(10) Patent No.: US 9,103,406 B2
(45) Date of Patent: Aug. 11, 2015

(54) TRANSMISSION VEE-BELT COMPRISING AN ELASTICALLY DEFORMABLE PERIPHERAL CUSHION

(71) Applicant: COLMANT CUVELIER SA, Lille (FR)

(72) Inventor: Patrick Salmon, Laventie (FR)

(73) Assignee: Colmant Cuveiler SA (FR)

(*) Notice: Subject to any disclaimer, the term of this patent is extended or adjusted under 35 U.S.C. 154(b) by 0 days.

(21) Appl. No.: 14/352,375

(22) PCT Filed: Oct. 16, 2012

(86) PCT No.: PCT/FR2012/052352
§ 371 (c)(1),
(2) Date: Apr. 17, 2014

(87) PCT Pub. No.: WO2013/057417
PCT Pub. Date: Apr. 25, 2013

(65) Prior Publication Data
US 2014/0243135 A1     Aug. 28, 2014

(30) Foreign Application Priority Data
Oct. 18, 2011   (FR) ........................... 11 59391

(51) Int. Cl.
    *F16G 1/04*     (2006.01)
    *F16G 1/00*     (2006.01)
    *F16G 5/00*     (2006.01)
    *F16G 9/00*     (2006.01)
    *F16G 5/08*     (2006.01)

(52) U.S. Cl.
    CPC ........................ *F16G 5/08* (2013.01)

(58) Field of Classification Search
CPC ............. F16G 5/06; F16G 5/166; F16G 5/20; F16G 5/08; B29D 29/10
USPC .................................. 474/260, 263, 265, 268
See application file for complete search history.

(56) References Cited

U.S. PATENT DOCUMENTS

| | | | | |
|---|---|---|---|---|
| 2,554,917 | A * | 5/1951 | Moon | 474/265 |
| 3,090,716 | A * | 5/1963 | Stevens | 474/260 |
| 3,164,026 | A * | 1/1965 | Terhune | 474/264 |
| 3,566,706 | A * | 3/1971 | Fix | 474/265 |
| 3,964,329 | A * | 6/1976 | Wolfe | 474/263 |
| 4,096,764 | A * | 6/1978 | Richmond et al. | 474/263 |
| 4,522,869 | A * | 6/1985 | Anderson et al. | 442/223 |

(Continued)

OTHER PUBLICATIONS

International Search Report dated Dec. 6, 2012.

*Primary Examiner* — Henry Liu
(74) *Attorney, Agent, or Firm* — Gerald E. Hespos; Michael J. Porco; Matthew T. Hespos

(57) ABSTRACT

A vee-shaped transmission belt (1) has a main core (10) in the shape of a trapezium made of natural and/or synthetic rubber, containing at least one substantially inextensible cord (20) extending over the entire length of the belt (1). At least one layer (14) of fiber-reinforced elastomer is placed in contact with the core (10) near the long base (2) of the trapezium. At least one thin external coating layer (18) envelopes the entirety of the core (10) and the reinforced layer (14) over the entire length of the belt (1). A peripheral cushion (17) made of an elastomer that is elastically softer and more deformable than the core (10) surrounds the core (10) and the layer (14) of fiber-reinforced elastomer and is surrounded by the coating layer (18).

10 Claims, 1 Drawing Sheet

(56) References Cited

U.S. PATENT DOCUMENTS

| | | | |
|---|---|---|---|
| 4,682,973 A * | 7/1987 | Fujita et al. | 474/263 |
| 4,778,437 A * | 10/1988 | Wach et al. | 474/260 |
| 5,232,409 A * | 8/1993 | Kanamori et al. | 474/260 |
| 6,461,264 B1 * | 10/2002 | Lofgren | 474/260 |
| 6,669,592 B2 * | 12/2003 | Hayashi | 474/268 |
| 8,507,391 B2 * | 8/2013 | Schleicher et al. | 442/182 |
| 2004/0048708 A1 * | 3/2004 | Nonnast et al. | 474/260 |
| 2008/0261739 A1 * | 10/2008 | Kanzow et al. | 474/266 |

* cited by examiner

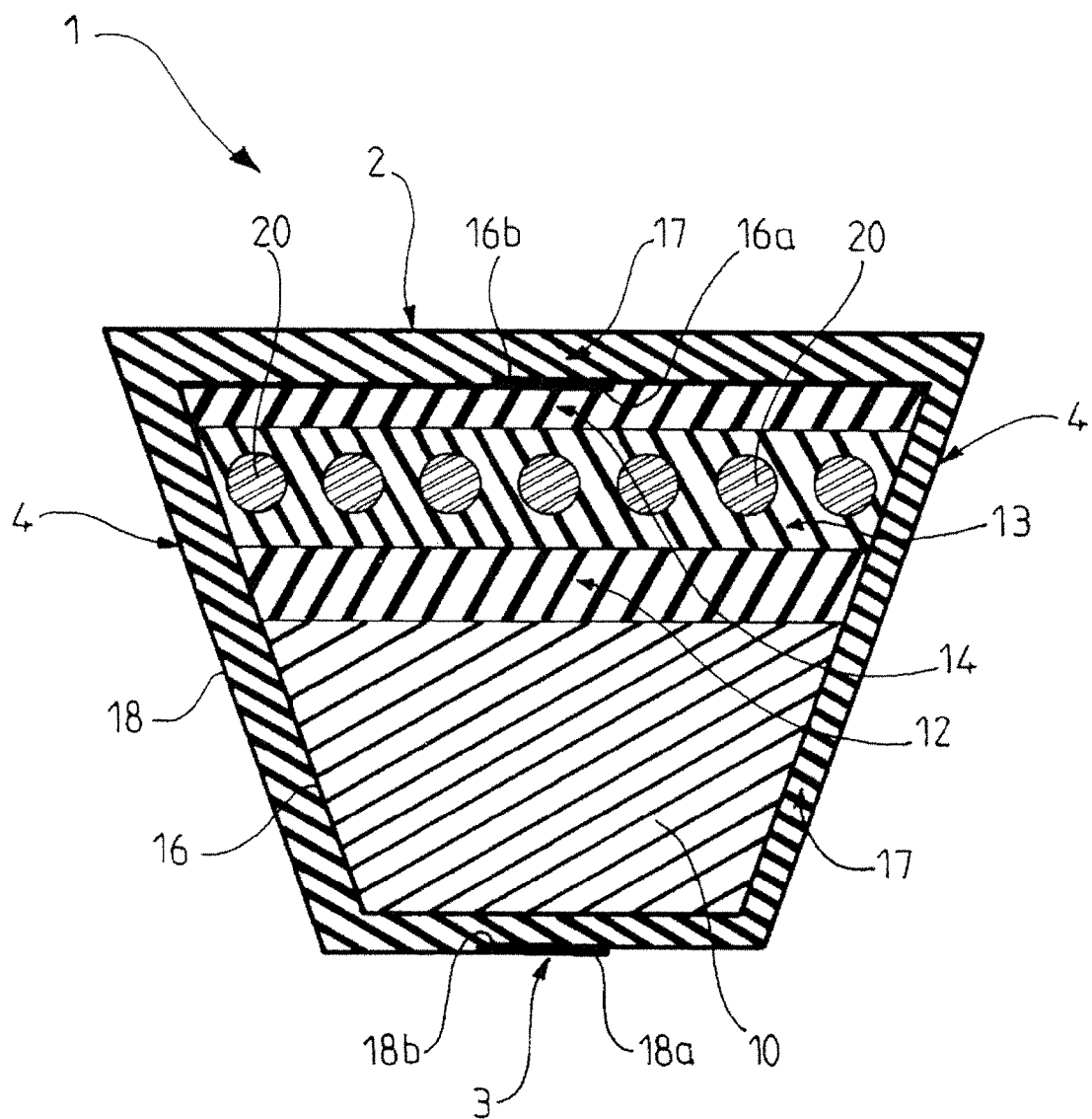

TRANSMISSION VEE-BELT COMPRISING AN ELASTICALLY DEFORMABLE PERIPHERAL CUSHION

BACKGROUND

1. Field of the Invention

The present invention relates to a vee-shaped endless transmission belt.

2. Description of the Related Art

There are currently in existence numerous types of vee-shaped transmission belts intended to be mounted on pulleys.

One example of a vee-belt notably comprises an elastomer heart in the form of a trapezium, a transverse reinforcing layer connected to the heart to prevent it from deforming, one or more cord(s), for example made of inextensible material, embedded in the structure (notably the heart) and a coating layer of coated fabric peripherally surrounding this assembly over the entire length of the belt.

However, these solutions are not entirely satisfactory because when the cord(s) is (are) inextensible, it is difficult to produce a whole series of belts having exactly the same dimensions. Now, in certain applications, it is necessary to be able to lengthen one or more belts slightly in order to bring it or them to the same length as others, for example in a drive system involving multiple parallel belts with identical separations, or in order to compensate for a differential separation between the axes of the pulleys bearing two or more parallel belts.

It is therefore an object of the present invention to overcome the abovementioned problems using a solution that is simple to manufacture, easy to use and optimized in terms of efficiency.

SUMMARY OF THE INVENTION

The subject of the present invention is a vee-shaped endless transmission belt comprising a main core in the shape of a trapezium made of natural and/or synthetic rubber, containing at least one substantially inextensible cord extending over the entire length of said belt, at least one layer of fiber-reinforced elastomer placed in contact with the core, near the long base of the trapezium, and at least one thin external coating layer, based on fabric laterally enveloping the entirety of the core and of the reinforced layer over the entire length of the belt. The vee-shaped endless transmission belt further comprises a peripheral cushion of rubber made of an elastomeric material which is elastically softer and more deformable than that of which the core is made. The cushion of rubber surrounds the core and the layer of fiber-reinforced elastomer over the entire length of the belt and is surrounded by the coating layer.

At least one other internal, fine coating layer substantially similar to the previous coating layer surrounds the layer of fiber-reinforced elastomer and the core and is in direct contact therewith, so that the cushion is positioned between the two coating layers.

The two coating layers each may close up around the core and/or the cushion and the layer of fiber-reinforced elastomer, respectively along the long base and along the short base, or vice versa.

One coating layer may close up along the long base by an overlapping of its free ends, whereas the other coating layer may close up along the short base through an overlapping of its free ends.

Another layer of fiber-reinforced elastomer may be positioned on the opposite side from the previously described reinforced layer and closer to the long base, so that the two layers of fiber-reinforced elastomer are arranged on each side of each cord.

Each cord may be coated in a bonding layer.

The belt may comprise several parallel cords, particularly around 2 to 10 and preferably 6 to 8.

The cushion may have a constant thickness of between around 0.1 mm and 1.5 mm, for example several tenths of a mm.

The cushion may be made of an elastomer based on natural rubber and on synthetic rubber SBR and may have a Shore A hardness comprised between around 45 and 65, preferably between 54 and 58; and Each coating layer may be made of cotton coated with a chloroprene-based rubber.

The invention will now be described in greater detail with reference to one particular embodiment given by way of illustration only and depicted in the attached FIG. 1.

BRIEF DESCRIPTION OF THE DRAWING

FIG. 1 is a cross-sectional view of a vee-shaped transmission belt in accordance with one embodiment of the invention.

DETAILED DESCRIPTION

FIG. 1 depicts a transmission belt 1 intended to be mounted under tension on two pulleys, a transmission first pulley, for example connected to the input shaft of a drive motor, and a receiving second pulley to which the rotational drive force is transmitted in order to drive an output shaft.

This belt 1 has a vee-shaped cross section with a long base 2, a short base 3 parallel to and opposite the long base, and two flanks 4 which are intended to rest against corresponding flanks of the transmission pulley and of the receiving pulley. In this regard, and in the usual manner, drive is effected through contact/grip between the flanks 4 of the belt and the flanks of the pulleys, without any contact between the bottom of the groove of the pulleys and the short base 3 of the belt 1.

As can be seen, the belt 1 comprises several layers joined together, notably in the hot state using vulcanizing.

First of all, the belt 1 comprises a central core 10 made of elastomer consisting of a blend of natural rubber and of synthetic rubber (SBR) and having a Shore A hardness of around 70 to 80, for example 75-76.

This core 10 has, on top of it in the direction of the long base 3, a layer 12 of reinforced elastomer containing synthetic fibers so that it has good transverse rigidity and deformation of the belt 1 is avoided. The thickness of this reinforced layer 12 may vary between around 1 and 6 mm, for example of the order of 2 to 3 mm. The Shore A hardness of the reinforced layer 12 is comprised between around 70 and 100, for example of the order of 85 to 90.

On top of this first reinforced layer 12, still in the direction of the long base 2, there is a bonding layer 13 of elastomer based on natural rubber having elastic memory. This bonding layer 13 has a thickness varying between around 0.2 and 3 mm, for example 0.4 to 2.4 mm, and a Shore A hardness comprised between around 50 and 70, for example of the order of 60 to 64.

Embedded in this bonding layer 13 is a series of parallel inextensible cords 20 based on aramid, for example made of Kevlar (registered trademark). These parallel cords 20 run all around the belt 1 and notably allow the rotational force to be transmitted mechanically from the transmission first pulley to the receiving second pulley.

Another layer 14 of elastomer, reinforced with synthetic fibers and identical to the previous layer 12 (in terms of material and hardness notably), is also added to the bonding layer 13, on top of the latter in the direction of the long base 2, so that the bonding layer 13 is sandwiched between the two reinforced layers 12 and 14. The result of this is that the cords 20, embedded in the bonding layer 13, are also positioned between the two reinforced layers 12 and 14. These two reinforcing layers 12 and 14 notably make it possible to avoid deformation of the belt 1 and, in particular, of the cords 20 (by bridging) because the tension produced by the pulleys may be particularly high and lead to high stresses. This reinforced layer 14 typically measures around 0.5 to 2 mm thick, for example 1 to 1.4 mm thick.

The assembly made up of the core 10, the two reinforcing layers 12 and 14, the bonding layer 13 and the cords 20 is surrounded by a coating layer 16 consisting of fabric, for example a cotton-based fabric, coated with chloroprene. This coating layer 16 extends around the entire circumference of the belt and forms a kind of first peripheral wrapper the ends 16a and 16b of which are folded over one on top of the other longitudinally so that they overlap so that they can be joined together. In the embodiment depicted, the coating layer 16 is closed up by joining (particularly in the hot state) at the longest base 2 of the belt 1, for example near the middle thereof.

A layer 17 forming a deformable cushion, made of an elastomer that is softer than that of which notably the core 10 is made, surrounds all of the first coating layer 16 (and therefore the core 10, the reinforced layers 12 and 14, the cords 20 and the bonding layer 13).

This cushion 17 has elasticity that is more pronounced than that of the core 10, of the reinforcing layers 12 and 14 and possibly of the bonding layer 13. By way of example, the elastomer of which the cushion 17 is made may have a Shore A hardness comprised between around 45 and 65, for example of the order of 54 to 58. The cushion 17 also has a coefficient of elongation at break that is 50 to 80% higher than that of the core 10. According to the embodiment depicted, the thickness of the cushion 17 is around 0.1 to 1.5 mm, typically of the order of a few tenths of a mm depending on the required elasticity (which is itself dependent on the material chosen and on the physico-chemical properties thereof).

Another coating layer 18, made from the same material as the previous coating layer 16 and having the same physico-chemical properties, peripherally surrounds all of the cushion 17 over the entire length of the belt 1. The ends 18a and 18b of this coating layer 18 are folded over one onto the other and overlap longitudinally to form a (hot) join running along the short base 3 of the belt 1, substantially in the middle thereof.

Thus, the cushion 17 is completely sandwiched between the two coating layers 16 and 18.

The choice to position the overlap of the two coating layers 16 and 18 in opposition on the two bases of the trapezium allows the belt 1 to be better balanced and avoids local additional thicknesses of fabric leading to stiffness (if the connecting overlaps of the ends 16a, 16b, 18a and 18b were to be situated in the same place).

Because this cushion 17 has good elasticity and a good coefficient of elongation, it allows the belt 1, once stretched and placed around the transmission and receiving pulleys, to deform by squashing substantially perpendicular to the surface of the flanks 4.

It will be recalled that the cords 20 are not extensible but that they serve to transmit the force induced by the transmission pulley. Thus, in order to be able to vary the circumference of the belt 1 (i.e. its length) slightly, it is impossible to rely on any elasticity of these cords 20.

It is therefore necessary to rely on the elasticity of the soft materials of which the belt 1 is made and, in particular, the elasticity of a layer which is not in contact with and/or does not contain the cords 20.

This then is the purpose of the peripheral cushion 17 which, by squashing by a few hundredths or tenths of a mm at the flanks 4 of the belt, allows the latter to become noticeably longer.

Thus, it is no longer essential to supply strictly identical belts to a customer who wishes to place several of them in parallel over pulleys with identical separations. Indeed quite often when a batch of belts is supplied for this type of application, some of the belts will be slightly shorter and others slightly longer. Because they each contain inextensible cords, it is highly probable that certain belts will be stretched more than others, and this may be to the detriment of the operation of the system. Thanks to the presence of the elastically deformable cushion 17, a kind of compensation tolerance is created through the squashing so that the slightly shorter belts can stretch slightly to reach the length of the others. Thus, the system with multiple parallel belts can operate efficiently and there is no need to supply strictly identical (calibrated) belts.

In another application, in instances in which the user has two exactly identical belts, if two pairs of parallel pulleys do not have exactly the same separation, it is possible to compensate for this differential because the elastically deformable cushion of the belt mounted on the pulleys that are closest together will deform in such a way as to lengthen the belt.

It goes without saying that the detailed description of the subject matter of the invention, which is given solely by way of illustration, does not in any way constitute a limitation, the technical equivalents also being comprised within the scope of the present invention.

Thus, the elastomeric materials that make up the various parts may vary, as may the inextensible material of which the cords are formed.

The invention claimed is:

1. A vee-shaped endless transmission belt (1) comprising:
   a main core (10) in the shape of a trapezium made of natural and/or synthetic rubber, containing at least one cord (20) extending over an entire length of said belt (1),
   at least one first layer (14) of elastomer placed in contact with the core (10), near a long base (2) of the trapezium,
   at least one thin external coating layer (18), and
   a peripheral cushion of rubber (17) made of an elastomeric material that is elastically softer and more deformable than the rubber of which the core (10) is made, said cushion of rubber (17) surrounding the core (10) and the first layer of elastomer over the entire length of the belt (1) and being surrounded by the first coating layer (18), wherein
   the first layer of elastomer (14) is reinforced with fibers and the external coating layer (18) comprises fabric and laterally envelops the entirety of the core (10) and of the reinforced layer (14) over the entire length of the belt (1).

2. The belt (1) of claim 1, further comprising a fine internal coating layer (16) substantially similar to the external coating layer (18) and surrounding the first layer of elastomer (14) reinforced with fibers and the core (10) and being in direct contact therewith, so that the cushion (17) is positioned between the two coating layers (16, 18).

3. The belt (1) of claim 2, wherein the two coating layers (16, 18) each close up around the core (10) and/or the cushion

(17) and the first layer of elastomer (14) reinforced with fibers, respectively along the long base (2) and along a short base (3), or vice versa.

4. The belt (1) of claim 3, wherein the internal coating layer (16) closes up along the long base (2) by an overlapping of its free ends (16a, 16b), whereas the external coating layer (18) closes up along the short base (3) through an overlapping of its free ends (18a, 18b).

5. The belt (1) of claim 1, further comprising a second layer of elastomer (12) reinforced with fibers and positioned on an opposite side from the first layer of elastomer (14) reinforced with fibers and closer to the long base (2), so that the first and second layers of elastomer (12, 14) reinforced with fibers are arranged on each side of the at least one cord (20).

6. The belt (1) of claim 1, wherein the at least one cord (20) is inextensible and is coated in a bonding layer (13).

7. The belt (1) of claim 1, wherein the at least one cord (20) comprises several parallel cords (20).

8. The belt (1) of claim 1, wherein the cushion (17) has a constant thickness of between around 0.1 mm and 1.5 mm.

9. The belt (1) of claim 1, wherein the cushion is made of an elastomer based on natural rubber and on synthetic rubber SBR and has a Shore A hardness of between around 45 and 65.

10. The belt (1) of claim 2, wherein each coating layer (16, 18) comprises cotton coated with a chloroprene-based rubber.

* * * * *

UNITED STATES PATENT AND TRADEMARK OFFICE
CERTIFICATE OF CORRECTION

| | | |
|---|---|---|
| PATENT NO. | : 9,103,406 B2 | Page 1 of 1 |
| APPLICATION NO. | : 14/352375 | |
| DATED | : August 11, 2015 | |
| INVENTOR(S) | : Salmon | |

It is certified that error appears in the above-identified patent and that said Letters Patent is hereby corrected as shown below:

Title Page, should read, item (73) Assignee: Colmant Cuvelier SA

Signed and Sealed this
Nineteenth Day of January, 2016

Michelle K. Lee
*Director of the United States Patent and Trademark Office*